(No Model.)

A. SNYDER.
CREAMER.

No. 282,678. Patented Aug. 7, 1883.

Witnesses.
Wm W. Sherwood
D. O. Manning

Inventor.
Alviras Snyder

N. PETERS, Photo-Lithographer, Washington, D. C.

UNITED STATES PATENT OFFICE.

ALVIRAS SNYDER, OF DRYDEN, (ETNA P. O.,) NEW YORK.

CREAMER.

SPECIFICATION forming part of Letters Patent No. 282,678, dated August 7, 1883.

Application filed May 11, 1882. (No model.)

*To all whom it may concern:*

Be it known that I, ALVIRAS SNYDER, of Dryden, (post-office address Etna,) Tompkins county, New York, have invented an Improved Creamer, or implement for the separation of cream from milk for dairy and family use, of which the following is a specification.

My object I accomplish by making a somewhat capacious vat or pan, in which I place side by side a series of milk-holders, in which I heat or cool the milk and keep it until the separation of the cream has taken place. This structure I inclose in an outer case made for and adapted to support it, and maintain a uniform temperature; and though many of its features are not new, yet the nature of my invention will be apparent as I describe it.

Figure 1:
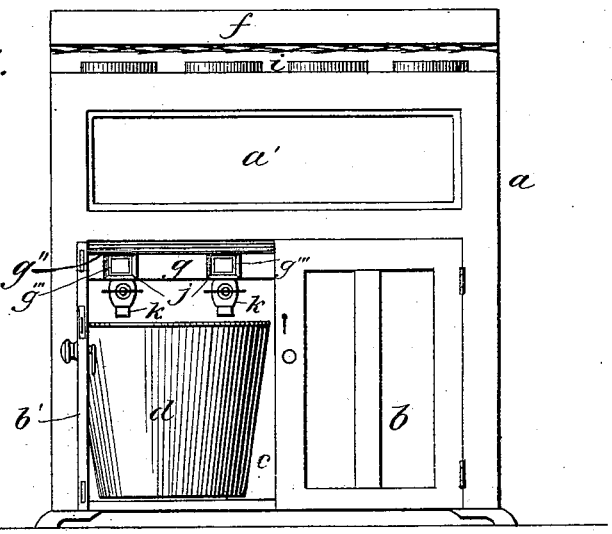
Figure 2:
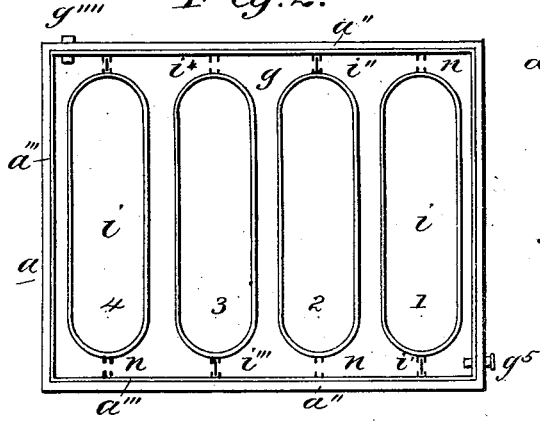
Figure 3:
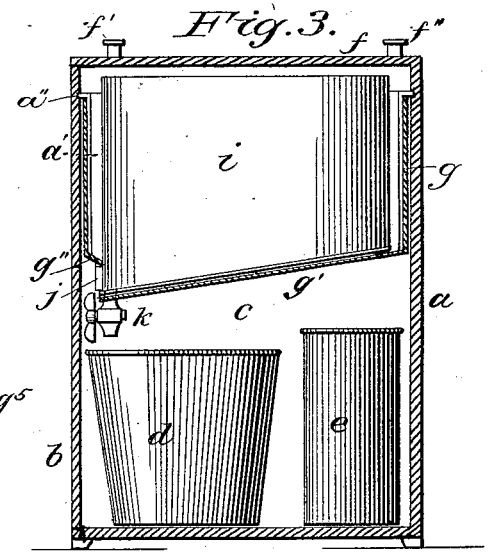
Figure 4:
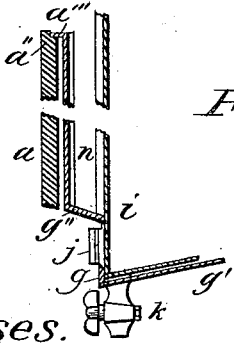
Figure 4:
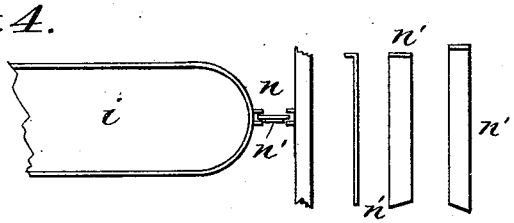

Figure 1 is a front elevation of my device. Fig. 2 is a view from above. Fig. 3 is a perpendicular transverse section, showing the structure of the case, vat, and holders; and Fig. 4 shows detached views of parts of my structure indicated by their letters.

In the figures, $a$ is the outer case, having two doors, $b\ b'$, that open into a space, $c$, beneath the cream-raising vat, which space contains the milk-buckets $d$ and the cream-pots $e$. This outer case is made not unlike a washstand which incloses under its cover the ewer and basin—a form much esteemed in certain parts of the country. In Fig. 3 a cover, $f$, is seen that shuts down on the form just named. The space behind the panel $a'$, Fig. 1, is also like the said form in that it is deep and holds the vessel put in it, and is separated from the space $c$ behind the doors $b$ below the partition. By a ledge, $a''$, cut in the top of the case $a$, a pan or vat, $g$, is suspended, and hangs down in the panel-space $a'$ in the manner just intimated. This metallic pan or vat has an inclined bottom, $g'$, (seen in Fig. 3,) to which are secured the oblong milk-holders $i$, side by side, shown to be four in number, though they may be two or more—any convenient number—and into them is put the milk when strained. They are some eighteen or twenty inches deep and some six inches wide and two feet long, and have inclined bottoms which fit or are parts of the vat $g$, the inclination being some three or four inches to the length of the holders, as shown, being at distances apart of three inches, in order to provide for the circulation or standing about them of any fluid or heating or cooling substance, and which controls the temperature of the milk in them. As shown in Figs. 1 and 3, the front wall of vat $g$ extends downward and is angularly bent or deflected inward at $g''$. Below this bend the wall of the vat is provided with a series of recessed portions, $g'''$, which are provided with openings for receiving and exhibiting the windows $j$ in the cans $i$. These cans may be secured to the vat at the place of these recessed portions by pieces soldered fast to both the cans and vat, or in any other desired manner, to form water-tight joints. Just below the bottoms of the holders and vat are faucets $k$, one to each holder, which are for the purpose of drawing the milk off from the holders, and after the milk the cream. When it is seen by the window $j$ that the milk is so far drawn off that the cream is approaching the faucet, the faucet is closed and the milk-bucket $d$ is removed and the cream-pot $e$ is put in its place and the cream drawn out, and so on with the other holders in the series, be they few or many. Thus it will be seen that I construct holders or oblong cream-raising cans quite deep and long for their width, with steeply-inclined bottoms, and place them in an inclosing-vat, by which their sides and ends, except about the window-apertures in their lower front edges, are exposed to fluids or substances, and either cool at once, or first heat and then cool the milk and let it stand until the cream has risen, when I draw off the milk and cream separately.

Gateways $n\ n$ with movable gate-slides $n'$, are placed at each end of each can or holder, opening or closing the space between the cans or holders and the vat-walls. Thus, if a gate is shut at the front $i'$ of can 1, and a gate shut at the rear of can 2 at $i''$, and spring-water at 48° or 52° of Fahrenheit is admitted at $g^5$, water circulates on the right hand of can or holder 1 around its rear end, and then between cans 1 and 2 to the front end of can 2, where a gate, $i'''$, causes it to flow to the rear of can 3, and so on until it escapes by the exit $g''''$, thus cooling the whole series of holders or cans; or gate $i'''$ and gate $i^4$ may be closed, and only two cans (1 and 2) be used when there is not milk enough to fill cans 3 and 4; or holders 1 and 2 may be cooled by ice-water and holders 3 and 4 by cool spring-water, and so on of other changes of circulation and use of fluids, &c., about the series of cans in part or whole. They are seen in Figs. 1 and 3 with their tops an inch or two above the top of the vat $g$, to be sure of their being above the water at all times. Various arrangements of pipes for hot or cold water might be named to supply heat or abstract it from the milk. The lid $f$ may have ventilation by gauze, or a blowing-draft be connected to force air under the lid and over the milk, to remove the animal odors and aid in the cooling of the milk, which air may be of the natural temperature, or cooled by being passed through cool spring-water or ice; and $f'$ is an entrance for said air, and $f''$ its exit, or the cool air may by a pipe be blown into the space $c$ to cool the cream-pots $e$.

The advantages and uses of my invention are apparent.

The principles and many of the parts of the device I have described have been long in public use. These I do not claim; but What I do claim is—

1. The vat $g$ and oblong or flattened cans $i$, arranged side by side therein, in combination with the gates $i'\ i''\ i'''\ i^4$ at their ends, whereby one or more of the cans of the series are shut off from use, or the current regulated about them, as set forth.

2. The vat $g$, bent inward, as shown, in its front wall, and having below said bent part a series of recessed parts, $g'''$, provided with openings, in combination with cans $i$, having windows $j$, as set forth.

ALVIRAS SNYDER.

Witnesses:
S. J. PARKER,
CHS. G. DAY.